Figure 11:
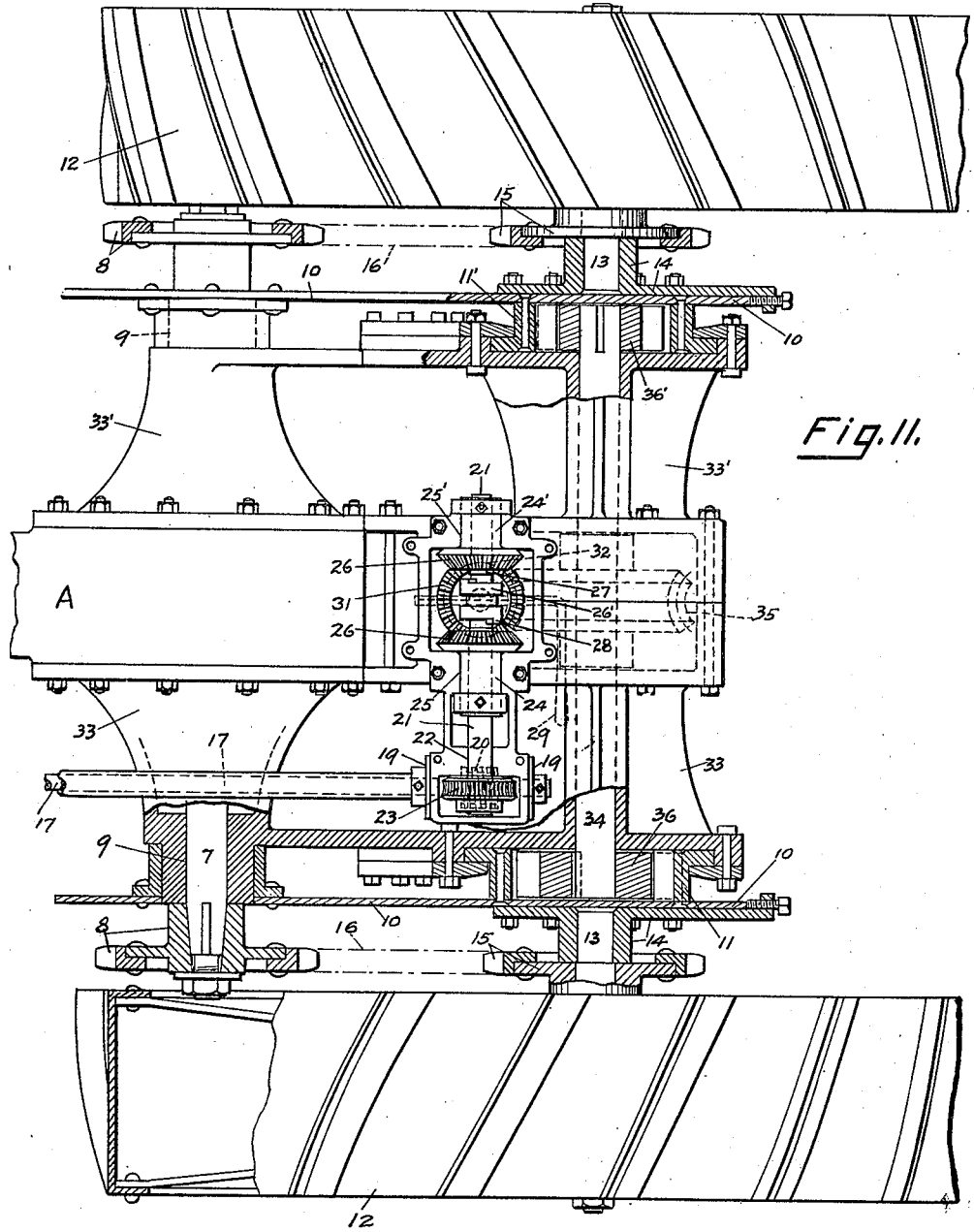

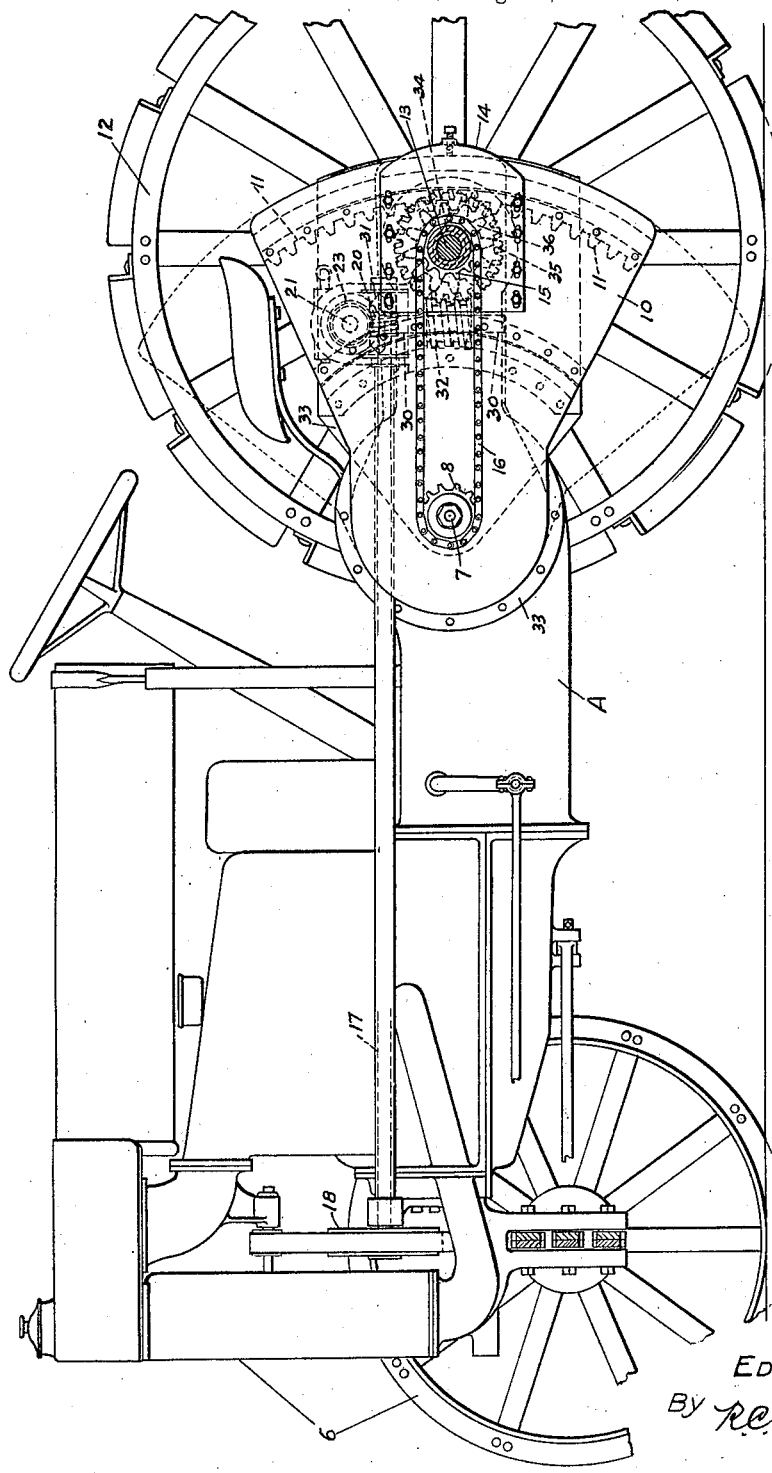

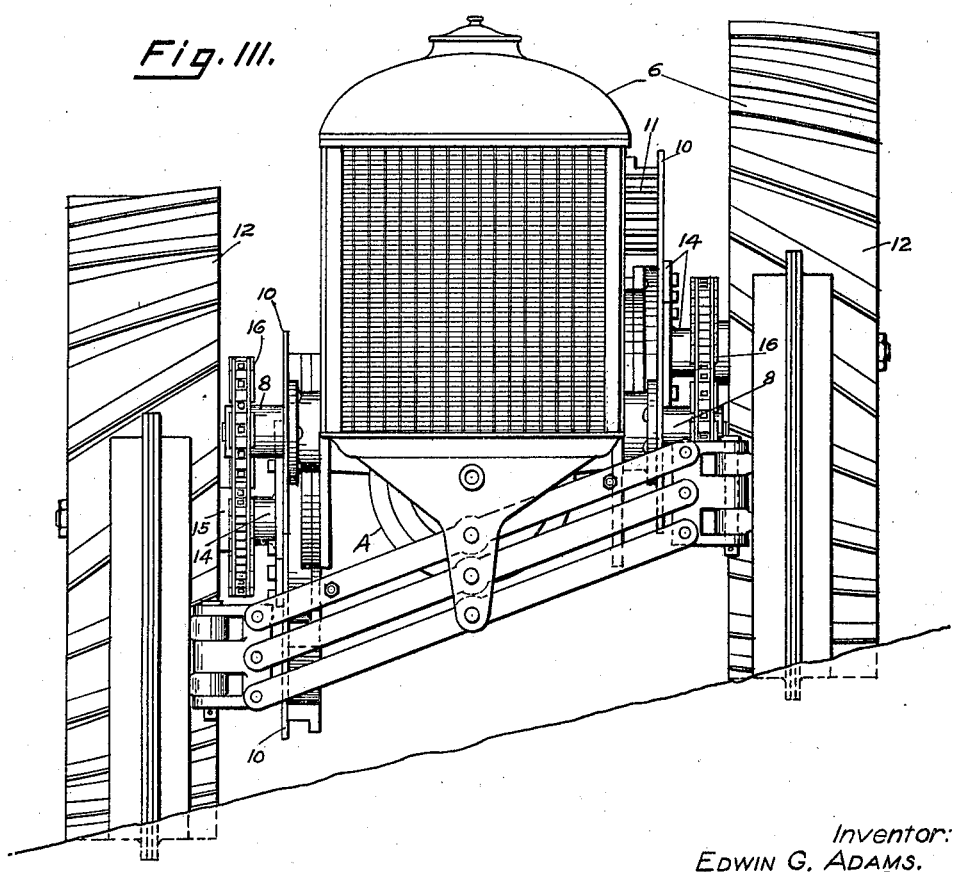

Apr. 10, 1923.
E. G. ADAMS
TRACTOR
Filed Aug. 4, 1922
1,451,194
4 sheets-sheet 4
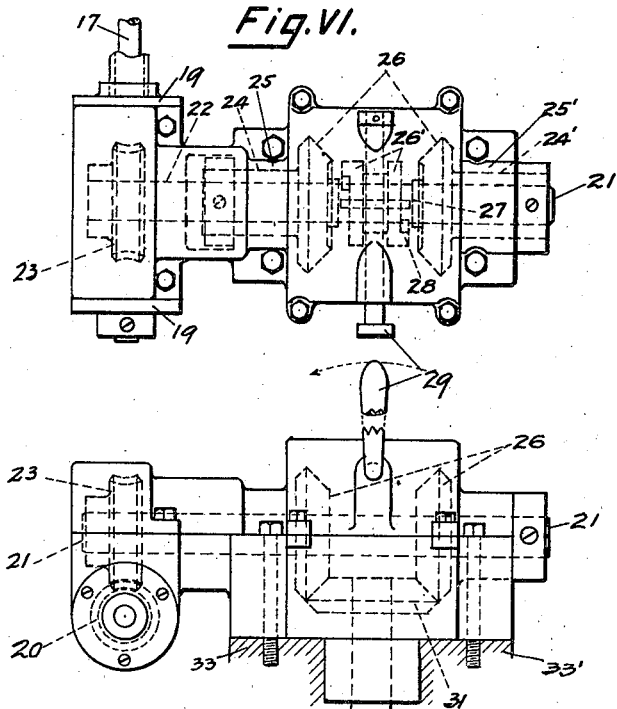
Fig. VI.
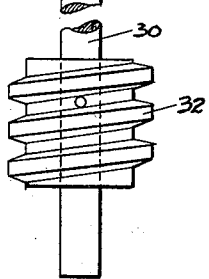
Fig. VII.
Inventor:
EDWIN G. ADAMS,
By R.C. Wright
Attorney.

Patented Apr. 10, 1923.

1,451,194

UNITED STATES PATENT OFFICE.

EDWIN G. ADAMS, OF THE DALLES, OREGON.

TRACTOR.

Application filed August 4, 1922. Serial No. 579,720.

*To all whom it may concern:*

Be it known that I, EDWIN G. ADAMS, a citizen of the United States, residing at The Dalles, in the county of Wasco and State of Oregon, have invented a new and useful Improvement in Tractors, of which the following is a specification, reference being had to the accompanying drawings.

My invention relates to tractors as a class. The object of my invention is to provide mechanism in a tractor whereby the wheels on each side may be caused to travel along differing planes. I accomplished these objects as well as others, by the construction, combination and arrangement of parts illustrated in the drawings which form a part hereof.

Fig. I is a side elevation of a tractor with rear wheel removed, parts in section, and containing my device therein.

Fig. II is a sectional plan view of the rear parts of a tractor with my device therein.

Fig. III is a front elevation of a tractor, showing travel on inclined plane with tilted wheels, and my device included therein.

Fig. IV is detail view of right hand racking device.

Fig. V is a sectional view on line V—V in Fig. IV.

Fig. VI is a plan view of case for bevel gears and clutch.

Fig. VII is a rear elevation of same case.

Like characters refer to like parts in the views.

A tractor 6, of common type, is illustrated in the views. It is provided with a motor and necessary intervening mechanism to transmit power to a driving shaft 7, as usual in such tractors. A main differential casing A is also provided. The shaft 7 has rigid sprockets 8 on each end. About the shaft 7, near each end, are bearing hubs 9, and upon said hubs, substantial plates 10 are rotatably mounted in their forward ends, the plates being practically in vertical and longitudinal planes, and their rearward parts having the form of the segments of a circle. Near the inner and rear edges of the plates, circular racks 11—11′ are rigidly secured upon the plates 10, the rack on the left having its teeth extending forwardly, and the rack on the right having teeth reversely positioned. The tractor wheels 12 have stub shafts 13, which are rigidly mounted in bearings 14 in the plates 10. Sprockets 15 are rigidly secured upon the tractor wheels 12, in alignment with the sprockets 8. Driving chains 16 extend about the respective pairs of sprockets. This arrangement is to allow the tractor wheel on either side to be moved vertically as the chassis remains in substantially a same horizontal plane while proceeding along a laterally inclined path of travel. The forward tractor wheels are illustrated with mechanism to allow them automatically to assume like relative positions with the tractor wheels on inclines, as indicated in my prior Letters Patent No. 1,282,667 of Oct. 22, 1918.

An auxiliary longitudinal driving shaft 17 is connected at one end to intermediate mechanism 18, through which power is transmitted to the shaft 17 from the motor source. The shaft 17 extends rearwardly to bearings 19 wherein it is rotatably mounted. Near the end of this shaft a worm 20 is rigidly secured upon it. A transverse shaft 21 is rotatably mounted in bearings 22 and within bevel gear hubs 25—25′. At one end of the shaft 21 extends over the worm 20 and has thereon a worm gear 23, which meshes with the worm 20. Centrally of the chassis a sleeve clutch 26′ is mounted on the shaft and is slidable along the same over a feather, rigid in the shaft, the sleeve clutch being thus arranged to allow its continuous rotation with the shaft and a certain longitudinal sliding movement thereon. The clutch has a shifting handle 29. Sleeves 24—24′ are mounted upon the shaft 21 on opposite sides of the clutch 26′ and rotate in bearings 25—25′, the upper half of bearings being shown as removed. The inner ends of these sleeves have rigid bevel gears 26 opposing the clutch 26′. The inner faces of these gears have clutch jaws 27 for positive sliding engagement with mating jaws 28 on the faces of the clutch 26′. Below the clutch 26′ is a rotatably mounted vertical shaft 30, on the upper end of which is a bevel gear 31 positioned to mesh with the gears 26. On the lower part of the shaft 30 is a worm 32. A rigid two-part casing 33 and 33′ is secured to the casing A. A part of said casing 33 and 33′ extends paralled with the casing A and the central part extends to and is connected with the casing A, enclosing intervening mechanism. Within the transverse part of the casing 33—33′ is a transverse shaft 34, rotatably mounted. Upon the central part of the shaft 34 is a worm gear 35 which meshes with the worm 32. Upon the ends of the shaft 34 are pinions 36—36' which mesh respectively with the forward and rearward racks 11—11'.

It will now be seen that the clutch 26' is shown out of engagement with the gears 26 in Fig. II and the wheels are travelling along a horizontal plane. To cause the wheels to assume the path of travel on a laterally inclined plane, as illustrated in Fig. III, the operator grasps the handle 29 and with it shifts the clutch into engagement with the right hand gear 26. The clutch rotates continually, and when its face locks into engagement with the segment of said gear, the gears cause the lower gear 31 to rotate the shaft 30 to the left and by intervening mechanism to cause the shaft 34 to rotate rearwardly. This in turn causes the right hand pinion 36' to move along the rack 11' and thus lowering the travel plane of the right tractor wheel. At the same time, the pinion 36 and rack 11 move in reverse direction to their corresponding members of the right side. In turn this raises the travel plane of the left tractor wheel. The forward wheels, having special mechanism as illustrated, are thus adapted automatically to assume the same inclined path of travel as that in which the tractor wheels are placed. It will be observed that the principle involved is to mount each tractor wheel separately on a stub shaft in bearings positioned in a member pivoted at its forward end in the chassis, the free end of the member extending rearwardly a convenient distance. Power is then transmitted from the drive shaft by intervening mechanism to each tractor wheel and these wheels on each side may be moved vertically to opposing and differing planes of travel while the chassis remains horizontal. Further, that these changes in the courses of the tractor wheels are accomplished by transmitting power through an independently controlled mechanism to oppositely disposed racks on the members carrying the tractor wheels, and this causes the said wheels to be raised or lowered oppositely to each other as desired and in accordance with the pre-determined manner in which the transmitting mechanism is regulated by manipulation of the operator. The device I have conceived is simple, direct and convenient in its operation. It is economical of construction and can easily be installed in tractors of common type at a moderate cost, adding greatly to their efficiency. It further extends the tread reasonably and tends to prevent the rearing of a short tractor to a position where it may overturn backwards.

I am aware that there are other devices to raise and lower tractor wheels, but contend that there is none having the principles involved in mine, which is a distinctly new and useful device. While I have arranged a convenient means to transmit power to raise and lower the suspended tractor wheels, other means may be employed to accomplish the same result without departing from the principle of my invention, and in this respect I do not limit myself to these means.

I claim—

1. In a tractor of common type, the combination of, independent members pivoted in their forward parts in the chassis and extending rearwardly, one having a rigid forward facing rack, the other a like reverse facing rack, also containing tractor wheels mounted on stub shafts rotatable in the free parts of said members, a transverse shaft rotatably mounted in the chassis, having rigid pinions on each end, positioned to mesh constantly with the opposing racks above mentioned, and mechanism arranged and adapted and by means of which said shaft and its pinions may be caused to rotate in either direction and thereby cause the tractor wheels to rise or descend desired distances in vertically opposite directions, without changing a substantially horizontal position of the chassis.

2. In a tractor of common type, the combination of, independent members pivoted in their forward parts in the chassis and extending rearwardly, one having a rigid forward facing rack, the other a like reverse facing rack, also containing tractor wheels mounted on stub shafts rotatable in the free parts of said members, a transverse shaft rotatably mounted in the chassis, having rigid pinions on each end, positioned to mesh constantly with the opposing racks above mentioned, mechanism arranged and adapted and by means of which said shaft and its pinions may be caused to rotate in either direction and thereby cause the tractor wheels to rise or descend desired distances in vertically opposite directions, without changing a substantially horizontal position of the chassis, and means to transmit power from the chassis to and control the aforesaid mechanism to cause said shaft to move as stated.

3. In a tractor of common type, the combination of, a chassis, independent members pivoted in their forward parts in the chassis and extending rearwardly, one having a rigid forward facing rack, the other a like reverse facing rack, also containing tractor wheels mounted on stub shafts rotatable in the free parts of said members, a transverse shaft rotatably mounted in the chassis, having rigid pinions on each end, positioned to mesh constantly with the opposing racks above mentioned, mechanism arranged and adapted and by means of which said shaft and its pinions may be caused to rotate in either direction and thereby cause the tractor wheels to rise or descend desired distances in vertically opposite directions, without changing a substantially horizontal position of the chassis, and means to transmit power from the chassis to and control the aforesaid mechanism to cause said shaft to move as stated.

4. In a tractor of common type. the combination of, a chassis, independent members pivoted in their forward parts in the chassis and extending rearwardly, one having a rigid forward facing rack, the other a like reverse facing rack, also containing tractor wheels mounted on stub shafts rotatable in the free parts of said members, a transverse shaft rotatably mounted in the chassis, having rigid pinions on each end, positioned to mesh constantly with the opposing racks above mentioned, mechanism arranged and adapted and by means of which said shaft and its pinions may be caused to rotate in either direction and thereby cause the tractor wheels to rise or descend desired distances in vertically opposite directions, without changing a substantially horizontal position of the chassis, means to transmit power from the chassis to and control the aforesaid mechanism to cause said shaft to move as stated, and independent mechanism to transmit power from a drive shaft in the chassis to each tractor wheel to cause the same to rotate.

EDWIN G. ADAMS.

Witnesses:
P. S. PLUMMER,
T. H. WEST.